(12) United States Patent
Liu et al.

(10) Patent No.: US 12,332,368 B2
(45) Date of Patent: Jun. 17, 2025

(54) POSITION CONFIGURATION METHOD, TERMINAL DEVICE, AND NETWORK DEVICE

(71) Applicant: VIVO MOBILE COMMUNICATION CO., LTD., Chang'an Dongguan (CN)

(72) Inventors: Siqi Liu, Chang'an Dongguan (CN); Zichao Ji, Chang'an Dongguan (CN); Kai Wu, Chang'an Dongguan (CN); Shuai Zhou, Chang'an Dongguan (CN); Wen Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 444 days.

(21) Appl. No.: 17/844,290

(22) Filed: Jun. 20, 2022

(65) Prior Publication Data
US 2022/0326333 A1    Oct. 13, 2022

Related U.S. Application Data

(63) Continuation of application No. PCT/CN2020/136243, filed on Dec. 14, 2020.

(30) Foreign Application Priority Data

Dec. 20, 2019   (CN) .......................... 201911329232.0

(51) Int. Cl.
*H04W 72/02*   (2009.01)
*G01S 5/00*   (2006.01)
(Continued)

(52) U.S. Cl.
CPC ......... *G01S 5/0054* (2013.01); *H04W 56/001* (2013.01); *H04W 64/00* (2013.01);
(Continued)

(58) Field of Classification Search
CPC ... G01S 5/0054; H04W 56/001; H04W 64/00; H04W 72/02; H04W 72/0453;
(Continued)

(56) References Cited

U.S. PATENT DOCUMENTS

2019/0110287 A1    4/2019  Lee et al.
2020/0280962 A1*   9/2020  Li .......................... H04L 5/0055

FOREIGN PATENT DOCUMENTS

CN    109587799 A    4/2019
CN    110061819 A    7/2019
(Continued)

OTHER PUBLICATIONS

China National Intellectual Property Administration, First Office Action issued in corresponding Application No. 201911329232.0, issued Aug. 15, 2022. (Translation not available.).
(Continued)

*Primary Examiner* — Chuong A Ngo
(74) *Attorney, Agent, or Firm* — Price Heneveld LLP

(57) ABSTRACT

The present disclosure discloses a position configuration method, a terminal device, and a network device. The position configuration method includes: determining position configuration information, where the position configuration information includes at least one of position shift information and position indication information; and determining a target position based on the position configuration information.

16 Claims, 3 Drawing Sheets

Determine position configuration information, where the position configuration information includes at least one of position shift information and position indication information ~101

Determine a target position based on the position configuration information ~103

(51) Int. Cl.
   *H04W 56/00*      (2009.01)
   *H04W 64/00*      (2009.01)
   *H04W 72/0453*    (2023.01)
   *H04W 72/51*      (2023.01)

(52) U.S. Cl.
   CPC ....... *H04W 72/02* (2013.01); *H04W 72/0453* (2013.01); *H04W 72/51* (2023.01)

(58) Field of Classification Search
   CPC .... H04W 72/51; H04W 24/08; H04L 5/0007; H04L 5/001; H04L 5/0048; H04L 5/0094; H04L 5/0008; H04L 5/0096
   See application file for complete search history.

(56) References Cited

FOREIGN PATENT DOCUMENTS

| | | | |
|---|---|---|---|
| CN | 110311763 | A | 10/2019 |
| CN | 110392989 | A | 10/2019 |
| CN | 110430617 | A | 11/2019 |
| WO | 2016/203290 | A1 | 12/2016 |
| WO | 2019115861 | A1 | 6/2019 |
| WO | 2019/137808 | A1 | 7/2019 |

OTHER PUBLICATIONS

China National Intellectual Property Administration, Second Office Action issued in corresponding Application No. 201911329232.0, issued Jan. 12, 2023. (Translation not available.).
Intellectual Property India, Examination Report issued in corresponding Application No. 202217040510, dated Dec. 9, 2022.
European Patent Office, Extended European Search Report issued in corresponding Application No. 20903498.2, dated Jan. 4, 2023.
LG Electronics, "Discussion on channel raster of NR V2X," 3GPP TSG-RAN WG4#93 Meeting, R4-1913955, Reno, US, Nov. 18-22, 2019.
CATT, vivo, "TP on channel raster for NR V2X UE," 3GPP TSG-RAN WG4 Meeting #93, R4-1916147, Reno, USA, Nov. 18-22, 2019.
China National Intellectual Property Administration, International Search Report issued in corresponding Application No. PCT/CN2020/136243 mailed Mar. 11, 2021.
"3rd Generation Partnership Project; Technical Specification Group Radio Access Network; NR; Radio Resource Control (RRC) protocol specification (Release 15)", 3GPP TS 38.331 V15.7.0 (Sep. 2019), Valbonne, France.
CATT, "Discuss on the channel arrangement design for NR V2X UE", 3GPP TSG-RAN WG4 Meeting #93, R4-1913702, Reno, USA, Nov. 18-22, 2019.

* cited by examiner

POSITION CONFIGURATION METHOD, TERMINAL DEVICE, AND NETWORK DEVICE

CROSS-REFERENCE TO RELATED APPLICATION

This application is a continuation of International Application No. PCT/CN2020/136243, filed on Dec. 14, 2020, which claims priority to Chinese Patent Application No. 201911329232.0, filed in China on Dec. 20, 2019, which is incorporated herein by reference in its entirety.

TECHNICAL FIELD

The present disclosure relates to the communication field, and in particular, to a position configuration method, a terminal device, and a network device.

BACKGROUND

Currently, in an existing mobile communication system, a frequency domain position may be indicated by using a position number. For example, in a Long Term Evolution (Long Term Evolution, LTE) system, an evolved universal terrestrial radio access absolute radio frequency channel number (E-UTRA Absolute Radio Frequency Channel Number, E-ARFCN) number indicates a carrier frequency. In a new radio (New Radio, NR) system, a new radio absolute radio frequency channel number (NR Absolute Radio Frequency Channel Number, NR-ARFCN) indicates a radio frequency reference frequency (Radio Frequency Reference Frequency) on a global frequency raster (Global Frequency Raster).

Specifically, an NR system is used as an example. A series of channel rasters (channel raster) are further defined in the NR system. The channel rasters are related to frequency bands in which the channel rasters are located. Based on the channel rasters, NR-ARFCNs on the frequency bands in which the channel rasters are located can be determined. Radio frequencies corresponding to these NR-ARFCNs are a subset of a radio frequency reference frequency, and may be used to identify a position of a carrier. One carrier center needs to be on one channel raster, and a frequency domain position corresponding to the channel raster may be used as a radio frequency reference frequency, and a channel raster in which one carrier center is located may be referred to as a channel raster of the carrier or a position of a radio frequency channel.

However, after an additional frequency shift is introduced in the foregoing mobile communication system, based on the foregoing existing position number, a frequency domain position obtained after a shift cannot be indicated. As a result, a position of a carrier cannot be accurately notified, which may lead to inconsistent understanding between transmitting and receiving parties, and consequently, a signal and communication cannot be normally received and transmitted.

SUMMARY

According to a first aspect of the present disclosure, a position configuration method performed by a first device is provided, which includes:
   determining position configuration information, where the position configuration information includes at least one of position shift information or position indication information; and
   determining a target position based on the position configuration information.

According to a second aspect of the present disclosure, a terminal device is provided, where the terminal device includes:
   a first determining module, configured to determine position configuration information, where the position configuration information includes at least one of position shift information or position indication information; and
   a second determining module, configured to determine a target position based on the position configuration information.

According to a third aspect of the present disclosure, a terminal device is provided, which includes a processor, a memory, and a computer program stored in the memory and capable of running on the processor, where the computer program is executed by the processor to implement the steps of the method according to the first aspect.

According to a fourth aspect of the present disclosure, a computer readable storage medium is provided, where the computer readable storage medium stores a computer program, and the computer program is executed by a processor to implement the steps of the method according to the first aspect.

According to a fifth aspect of the present disclosure, a network device is provided, where the network device includes:
   a first determining module, configured to determine position configuration information, where the position configuration information includes at least one of position shift information or position indication information; and
   a second determining module, configured to determine a target position based on the position configuration information.

According to a sixth aspect of the present disclosure, a network device is provided, which includes a processor, a memory, and a computer program stored in the memory and capable of running on the processor, where the computer program is executed by the processor to implement the steps of the method according to the first aspect.

In the embodiments of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information.

BRIEF DESCRIPTION OF THE DRAWINGS

Accompanying drawings described herein are used for providing further understanding about the present disclosure, and constitute a part of the present disclosure. Exemplary embodiments of the present disclosure and descriptions thereof are used for explaining the present disclosure, and do not constitute an inappropriate limitation to the present disclosure. In the accompanying drawings.

DETAILED DESCRIPTION

Figure 1:
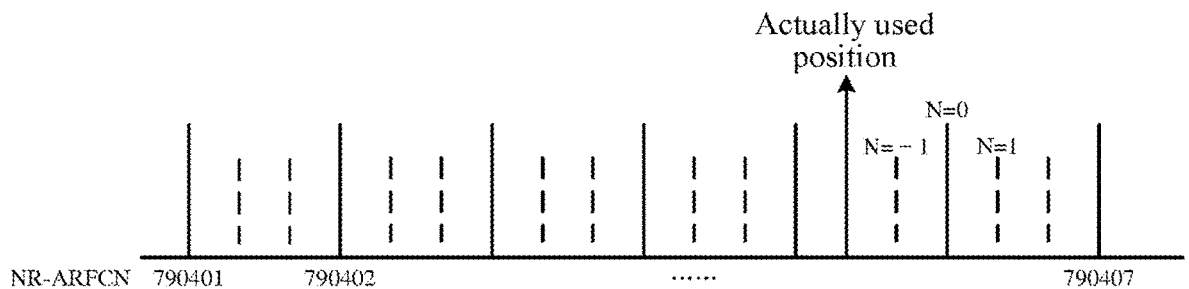
FIG. 1 is a schematic distribution diagram of frequency domain positions after an additional shift is introduced.

The following clearly describes the technical solutions in the embodiments of the present disclosure in full with reference to the accompanying drawings in the embodiments of the present disclosure. Apparently, the described embodiments are merely some of but not all of the embodiments of the present disclosure. All other embodiments derived by a person of ordinary skill in the art based on the embodiments of the present disclosure without making any creative efforts fall within the protection scope of the present disclosure.

The technical solutions in the embodiments of the present disclosure can be applied to various communication systems such as a global system for mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), LTE advanced (Long Term Evolution Advanced, LTE-A), and NR (new radio).

User equipment UE may also be referred to as a terminal device (Mobile Terminal), mobile user equipment, or the like, may communicate with one or more core networks through a radio access network (Radio Access Network, RAN). The user equipment may be a terminal device, such as a mobile phone (or referred to as a "cellular" phone) or a computer with a terminal device, and for example, may be a portable, pocket-sized, handheld, computer built-in, or in-vehicle mobile apparatus exchanging language and/or data with the RAN.

A network device may also be referred to as a base station, may be a base transceiver station (Base Transceiver Station, BTS) in the GSM or CDMA, or may be a NodeB (NodeB) in WCDMA, or may be an evolved NodeB (evolutional Node B, eNB, or e-NodeB) in LTE, or may be a next-generation NodeB (gNB) in a future 5G network. In an NR system, when a radio frequency reference frequency on a global frequency raster is indicated by using an NR-ARFCN, a relationship between the NR-ARFCN and the radio frequency reference frequency meets the following formula:

$$F_{REF}=F_{REF\text{-}Offs}+\Delta F_{Global}\times(N_{REF}-N_{REF\text{-}Offs})$$

$F_{REF}$ represents the radio frequency reference frequency, in a unit of MHz, $N_{REF}$ represents the NR-ARFCN, $\Delta F_{Global}$ represents a global frequency domain raster gap or frequency domain granularity of the global frequency domain raster or indication granularity of the global frequency domain raster (that is, a frequency domain gap between two adjacent radio frequency reference frequencies in the global frequency domain raster, and higher granularity indicates a smaller frequency domain gap), $F_{REF\text{-}Offs}$ represents a frequency domain start point, and $N_{REF\text{-}Offs}$ represents a frequency domain start point number.

For definitions of $F_{REF\text{-}Offs}$, $N_{Ref\text{-}Offs}$ and $N_{REF}$ in 0-100 GHz, refer to Table 1.

TABLE 1

| Frequency range/MHz | $\Delta F_{Global}$/ kHz | $F_{REF\text{-}Offs}$/ MHZ | $N_{Ref\text{-}Offs}$ | $N_{REF}$ range |
| --- | --- | --- | --- | --- |
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

It can be learned from the foregoing table that when a frequency range is 0-3 GHz, frequency domain granularity $\Delta F_{Global}$ that can be indicated by the NR-ARFCN is 5 kHz; when the frequency range is 3 GHz-24.25 GHz, the frequency domain granularity $\Delta F_{Global}$ that can be indicated by the NR-ARFCN is 15 kHz. For a schematic diagram of some frequency bands, refer to FIG. 1. When the frequency range is 24.25 GHz-100 GHz, the frequency domain granularity $\Delta F_{Global}$ that can be indicated by the NR-ARFCN is 60 kHz. A similar manner also exists in LTE, where the E-ARFCN indicates a carrier frequency, and frequency domain granularity or indication granularity of the E-ARFCN in LTE is 100 kHz.

In the NR system, granularity of a channel raster is related to a frequency band on which the channel raster is located. For example, granularity of a channel raster on a refarming band (refarming band, which refers to a frequency band used for redefinition of a frequency band used in LTE and is used for NR) may be 100 kHz, that is, one of 20 global frequency domain rasters may be used for the channel raster. granularity $\Delta F_{Raster}$ of the channel raster may be a gap between two adjacent frequency domain positions in the channel raster, and $\Delta F_{Raster}$ is greater than or equal to the global frequency raster gap $\Delta F_{Global}$. Granularity of a channel raster on some channels may be 15 kHz, 30 kHz, 60 kHz, or 120 kHz. For a frequency band of a channel raster that can support two types of $\Delta F_{Raster}$, only when a synchronization signal block (Synchronization Signal Block, SSB) subcarrier spacing (Subcarrier Spacing, SCS) is equal to a larger $\Delta F_{Raster}$ and the channel uses the SCS only, a channel raster of greater granularity is used. In LTE, the channel raster only supports granularity of 100 kHz.

In NR, a base station may deploy a carrier, deploy a bandwidth part (Bandwidth Part, BWP), deploy a resource grid, indicate a position of an SSB, indicate a position of a reference signal (Reference Signal, RS), indicate a position of a reference point A, another resource element, and the like by using an NR-ARFCN. Because radio frequencies corresponding to these NR-ARFCNs are a subset of a radio frequency reference frequency, a user may identify a position of a carrier, a position of a BWP, a position of a sidelink synchronization signal block (Sidelink Synchronization Signal Block, S-SSB), a position of an RS, a channel raster, a radio frequency (Radio Frequency, RF) reference frequency, a position of a resource block (Resource Block, RB), a position of a point A, a position of a channel, a position of a resource pool, a position of a subchannel, a position of a measurement object, a position of another resource element based on the obtained NR-ARFCNs, and acknowledge deployment of a resource grid.

In the NR system, the base station may deploy or configure the carrier and the BWP based on the point A. A UE may determine the position of the point A in one of the following manners:

(1) The base station configures an NR-ARFCN corresponding to the point A. After obtaining the NR-ARFCN, the UE may push out the position of the point A.

(2) The base station configures a distance offset0 between the SSB and the point A, and the UE pushes out the position of the point A based on the distance and a searched frequency domain position of the SSB. For a frequency range FR1, offset0 is X 15-kHz resource blocks (Resource Block, RB)+Y 15-kHz subcarriers; and for a frequency range FR2, offset0 is X 60-kHz RBs+subcarriers of SCSs of Y corresponding system information blocks (System Information Block, SIB) 1.

Figure 2:
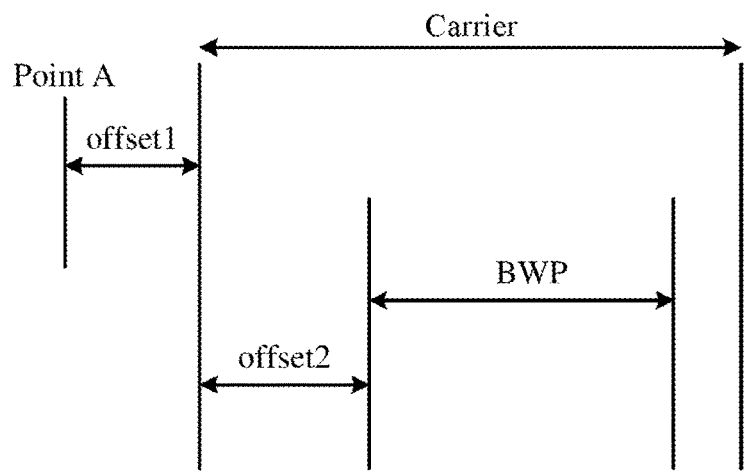
FIG. 2 is a schematic diagram of a relationship among a position of a point A, a position of a carrier, and a position of a BWP.

Further, the UE may determine the position of the carrier based on the position of the point A, and determine the position of the BWP based on the position of the carrier, as shown in FIG. 2.

The base station configures a distance offset1 between the point A and a boundary of the carrier, an SCS of the carrier, and a bandwidth of the carrier; and offset1 is used to indicate a quantity of RBs, and the SCS is the SCS of the carrier. In this way, the UE may derive the position and the range of the carrier based on the foregoing configuration information and the position of the point A, and may further determine a channel raster in which a center of the carrier is located.

The base station configures a distance offset2 between the carrier and a boundary of the BWP, an SCS of the BWP, and a bandwidth of the BWP; and offset2 is used to indicate a quantity of RBs, and the SCS is the SCS of the BWP. Generally, the bandwidth of the BWP and offset2 are indicated jointly in the form of a resource indicator value (Resource indicator value, RIV). In this way, the UE may derive the position and the range of the BWP based on the foregoing configuration information and the position of the carrier.

A sidelink (sidelink, SL) in this embodiment of the present disclosure supports the following several scenarios:

(1) The NR base station (a base station belonging to NR) controls an NR SL. In this scenario, the NR base station may configure an NR SL resource for an SL terminal device.

(2) An LTE base station (a base station belonging to LTE) controls the NR SL. In this scenario, the LTE base station may configure an NR SL resource for the SL terminal device.

(3) The NR base station controls an LTE SL. In this scenario, the NR base station may configure an LTE SL resource for the SL terminal device.

(4) The LTE base station controls an LTE SL. In this scenario, the LTE base station may configure an LTE SL resource for the SL terminal device.

The sidelink may also be referred to as a side link, a straight-through link, a directly connected link, or the like. A terminal device on the sidelink may be a transmit end at a time point and may be a receive end at another time point.

That the NR base station controls the NR SL and the LTE base station controls the LTE SL belong to intra-radio access technology (intra-Radio Access Technology, intra-RAT) scheduling. That the LTE base station controls the NR SL and the NR base station controls the LTE SL belong to inter-radio access technology (inter-Radio Access Technology, inter-RAT) scheduling. The technical solutions in the embodiments of the present disclosure may be applied to inter-RAT and intra-RAT scheduling, that is, include at least one of the following: A gNB provides position configuration information of an NR sidelink, an eNB provides position configuration information of an NR sidelink, a gNB provides position configuration information of an LTE sidelink, or an eNB provides position configuration information of an LTE sidelink.

Further, an SL design can be applied to specific public safety services (such as emergency communication at a fire or an earthquake), or can be applied to vehicle to everything (Vehicle to Everything, V2X) communication, or the like, and can also be used for commercial (commercial) purposes, such as communication between devices and communication related to business services. In the NR system, to enable NR V2X to coexist with LTE V2X, a frequency shift of $N \times \Delta_F + \Delta_{shift}$ is introduced for a channel raster of NR V2X, where $\Delta F = 5$ kHz, N represents an offset of $\Delta_F$, that is, how many 5 kHz is shifted, $N \times \Delta_F$ represents one shift (that is, a specific example of a first position shift, where $\Delta F$ represents a target position shift), and $\Delta_{shift}$ represents another shift (that is, a specific example of a second position shift).

For a UE of NR V2X, granularity of a channel raster depends on an SCS (that is, the foregoing 15 kHz, 30 kHz, 60 kHz, or 120 kHz) supported by a frequency band in which the channel raster is located, and a radio frequency reference frequency may be shifted according to the following formula:

$$F_{REF\_V2X} = F_{REF} + N \times \Delta_F \pm \Delta_{SHIFT},$$

A value set of N is $\{-1, 0, 1\}$, $\Delta_F = 5$ kHz, $\Delta_{shift} = 0$ kHz, or 7.5 kHz.

Alternatively, at least one of N, $\Delta_F$, or $\Delta_{shift}$ may be provided in at least one manner of indication by using protocol definition, network device configuration, pre-configuration, or another terminal device.

Because an additional frequency shift is introduced in the NR system, a frequency position after a shift cannot be indicated based on an existing position number (for example, an NR-ARFCN and an E-ARFCN). As shown in FIG. 1, an NR-ARFCN used for indication is used as an example, a frequency domain position actually used is different from a position indicated by the NR-ARFCN. Therefore, an accurate position of a point A, a position of a carrier, an RF reference frequency, a position of a BWP, a channel raster, a position of an S-SSB, a position of a channel, a position of a subchannel, a position of an RB, a position of a resource pool, a position of an RS, a position of a resource grid, a position of a subcarrier, a modulation position, an up-conversion position, a position of a measurement object, and the like cannot be accurately notified, which may lead to an inconsistent understanding between receiving and transmitting parties, and therefore, a signal and communication cannot be normally received and transmitted.

Therefore, a new position configuration method needs to be used to resolve the foregoing technical problem, so as to accurately determine a position.

The technical solutions provided by the embodiments of the present disclosure are described in detail as follows with reference to accompanying drawings.

Figure 3:
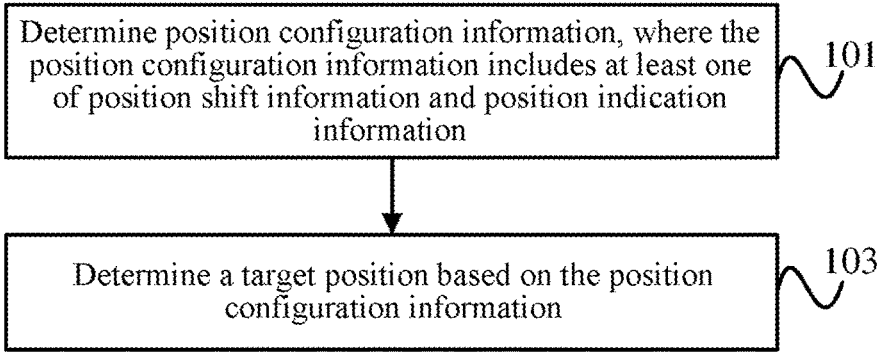
FIG. 3 is a schematic flowchart of a position configuration method according to an embodiment of the present disclosure.

Referring to FIG. 3, an embodiment of the present disclosure provides a position configuration method. The position configuration method is performed by a first device. The first device may be used as a transmit end device or may be used as a receive end device, and the first device may be either a terminal device or a network device. The method may include the following content:

Step 101: Determine position configuration information, where the position configuration information includes at least one of position shift information or position indication information.

Step 103: Determine a target position based on the position configuration information.

In this embodiment of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information. In this way, an accurate position can be learned by using the position configuration information in the embodiments of the present disclosure, to resolve a problem that a position after a shift cannot be indicated based on an existing NR-ARFCN because an additional position shift is introduced.

Optionally, the position configuration information may be position configuration information on a sidelink.

Optionally, there may be one or more target positions determined based on corresponding position configuration information.

Optionally, in the position configuration method in this embodiment of the present disclosure, the target position includes at least one of: a position of a reference point A, a position of a carrier, a position of a radio frequency RF reference frequency, a position of a bandwidth part BWP, a channel raster, a position of an S-SSB, a position of a channel, a position of a subchannel, a position of an RB, a position of a resource pool, a position of a reference signal RS, a position of a resource grid (Resource Grid), a position of a subcarrier, a modulation position, an up-conversion position, or a position of a measurement object.

Optionally, the position of a carrier, the position of a resource grid, the position of a BWP, and the position of an S-SSB may respectively correspond to a center of a carrier, a center of a resource grid, a center of a BWP, and a center of an S-SSB; or may respectively correspond to an upper or lower boundary of a carrier, an upper or lower boundary of a resource grid, an upper or lower boundary of a BWP, and an upper or lower boundary of an S-SSB; or may respectively correspond to a predetermined position of a carrier, a predetermined position of a resource grid, a predetermined position of a BWP, and a predetermined position of an S-SSB, for example, the sixth subcarrier or the 0th subcarrier of an RB.

Optionally, the position of a resource pool, the position of a subchannel, and the position of an RS may respectively correspond to a start point of a resource pool, a start point of a subchannel, and a start point of an RS. The start point of a resource pool may be one of the first RB, the first subcarrier, an RB with an index index=0, a lowest frequency position, and the like in a frequency domain resource range occupied by the resource pool; the start point of a subchannel may be one of the first RB, the first subcarrier, an RB with an index=0, a lowest frequency position, and the like in a frequency domain resource range occupied by the subchannel; and the start point of an RS may be one of the first RB, the first subcarrier, an RB with an index=0, a lowest frequency position, and the like in a frequency domain resource range occupied by the RS.

Alternatively, the position of a resource pool, the position of a subchannel, and the position of an RS may respectively correspond to a center of a resource pool, a center of a subchannel, and a center of an RS.

Alternatively, the position of a resource pool, the position of a subchannel, and the position of an RS may respectively correspond to an end point of a resource pool, an end point of a subchannel, and an end point of an RS. The end point of a resource pool may be one of the last RB, the last subcarrier, an RB with a largest number, a highest frequency position, and the like in a frequency domain resource range occupied by the resource pool; the end point of a subchannel may be one of the last RB, the last subcarrier, an RB with a largest number, a highest frequency position, and the like in a frequency domain resource range occupied by the subchannel; and the end point of an RS may be one of the last RB, the last subcarrier, an RB with a largest number, a highest frequency position, and the like in a frequency domain resource range occupied by the RS.

Alternatively, the position of a resource pool, the position of a subchannel, and the position of an RS may respectively correspond to a predetermined position of a resource pool, a predetermined position of a subchannel, and a predetermined position of an RS.

Optionally, the position of an RB may be a frequency domain position of a preset RB, and the preset RB may be a lowest RB, a minimum number RB, a central RB, a highest RB, or a maximum number RB. Alternatively, the position of an RB may be a frequency position of a preset subcarrier, and the preset subcarrier may be a lowest subcarrier, a minimum number subcarrier, a central subcarrier, a highest subcarrier, or a maximum number subcarrier of a preset RB. Further, the frequency domain position of the preset RB may be a frequency center of the preset RB, a frequency corresponding to an upper boundary of the preset RB, or a frequency corresponding to a lower boundary of the preset RB. The frequency domain position of the preset subcarrier may be a frequency center of the subcarrier, a frequency corresponding to an upper boundary of the subcarrier, or a frequency corresponding to a lower boundary of the subcarrier.

Further, in a case that there are a plurality of target positions, the plurality of positions may be associated, for example, a position of a reference point A, a position of a carrier, and a position of a BWP are associated, and the position of the carrier is derived based on the reference point A (point). There may alternatively be no association between the plurality of positions, such as positions of different RSs.

The RS includes at least one of: a demodulation reference signal (Demodulation Reference Signal, DMRS), a channel state information reference signal (Channel State Information Reference Signal, CSI-RS), a phase tracking reference signal (Phase Tracking Reference Signal, PT-RS), a sounding reference signal (Sounding Reference Signal, SRS), or a position reference signal (Position Reference Signal, PRS). The channel includes at least one of a data channel, a control channel, a broadcast channel, or a feedback channel.

Further, in the position configuration method in this embodiment of the present disclosure, the position configuration information may be a parameter corresponding to at least one of: a position of a reference point A, a position of a carrier, a radio frequency RF reference frequency, a position of a bandwidth part BWP, a channel raster, a position of an S-SSB, a position of a channel, a position of a subchannel, a position of an RB, a position of a resource pool, a position of a reference signal RS, a position of a resource grid, a position of a subcarrier, a modulation position, an up-conversion position, or a position of a measurement object.

Further, optionally, in addition to including positions of one or more objects, the target position determined based on the position configuration information may further include one or more positions corresponding to a specific object for the specific object. Details are as follows:

When the target position determined based on the position configuration information includes a position of a carrier, in a embodiment, positions of one or more carriers may be determined based on the position configuration information, for example, a position of at least one of a carrier 1, a carrier 2, or a carrier 3 is determined based on the position configuration information. In another embodiment, one or more positions in the carrier may be determined based on the position configuration information, for example, at least one of a center, an upper boundary, or a lower boundary of the carrier 1 is determined based on the position configuration information.

When the target position determined based on the position configuration information includes a position of a BWP, in a embodiment, positions of one or more BWPs may be determined based on the position configuration information, for example, a position of at least one of a BWP1, a BWP2, or a BWP3 is determined based on the position configuration information. In another embodiment, one or more positions in the BWP may be determined based on the position configuration information, for example, at least one of a center, an upper boundary, or a lower boundary of the BWP1 is determined based on the position configuration information.

When the target position determined based on the position configuration information includes a position of a resource pool, in a embodiment, positions of one or more resource pools may be determined based on the position configuration information, for example, a position of at least one of a resource pool 1, a resource pool 2, or a resource pool 3 is determined based on the position configuration information. In another embodiment, one or more positions in the resource pool may be determined based on the position configuration information, for example, at least one of a center, an upper boundary, or a lower boundary of the resource pool 1 is determined based on the position configuration information.

Further, in the position configuration method in this embodiment of the present disclosure, different solutions for determining the target position may be implemented based on different content included in the position configuration information. The following descriptions are provided with reference to embodiments.

Embodiment 1

In this Embodiment 1, if the position configuration information includes position shift information, step 103 may be: determining the target position based on the position shift information.

Further, a solution for determining the target position based on the position shift information may be the following content:

Determine a reference position.

Optionally, the reference position may include a position determined based on the foregoing existing position number, a channel raster, a synchronization raster, a global frequency domain raster, or another preset granularity, for example, include at least one of: a position of a point A, a position of a carrier, a position of a BWP, a channel raster, a position of an S-SSB, a position of an RS, a position of a resource grid, a position of a channel, a position of a subchannel, an RF reference frequency, a position of an RB, a position of a resource pool, or a position of a measurement object, which are determined based on existing granularity.

The existing position number may include at least one of: an NR-ARFCN, an E-ARFCN, a global synchronization channel number (Global Synchronization Channel Number, GSCN), another preset frequency domain position number, and the like.

Optionally, the another preset frequency domain position number is a position number in a preset frequency domain range, for example, a subcarrier number in an RB range, a subcarrier number or an RB number in a carrier range, a subcarrier number or an RB number in a BWP range, a subcarrier number or an RB number in a resource pool range, a subcarrier number or an RB number in a subchannel range.

Perform shifting based on the reference position according to the position shift information to determine the target position.

It may be understood that in a case that the position shift information is known, the reference position needs to be first determined, and then the final target position can be accurately obtained by performing shifting based on the position shift information.

Further, optionally, the position shift information includes a displacement shift value.

In this embodiment, a specific total position shift value may be directly indicated by using the position shift information. Therefore, after the position shift value determined based on the reference position is directly shifted, the final target position may be accurately obtained. The position shift value may be defined in a protocol, configured by a network device, preconfigured, or indicated by another terminal device.

Further, optionally, the position shift information includes at least one of a first position shift or a second position shift.

In this embodiment, one or more position shifts may be indicated by using the position shift information, and then shifting is performed based on a specific case of the one or more position shifts on the basis of the reference position, so as to accurately obtain the final target position.

Optionally, one total position shift value may be first determined based on at least one of the first position shift or the second position shift, and further, the total position shift value is shifted based on the reference position to obtain the final target position.

Further, optionally, the second position shift is determined based on a target position shift and times of shift based on the target position shift.

Optionally, in the position configuration method in this embodiment of the present disclosure, the value of the target position shift includes but is not limited to 5 kHz, 10 kHz, or 20 kHz.

Optionally, in the position configuration method in this embodiment of the present disclosure, the target position shift is related to a target subcarrier spacing SCS.

It may be understood that the value of the target position shift may be different based on a different target SCS. For example, if the target SCS is 15 kHz, the target position shift $\Delta_F$=5 kHz; if the target SCS is 30 kHz, $\Delta_F$=10 kHz; or if the target SCS is 60 kHz, $\Delta_F$=20 kHz.

Optionally, in the position configuration method in this embodiment of the present disclosure, the target position shift is related to channel raster granularity.

It may be understood that the value of the target position shift may be different based on different channel raster granularity. For example, if the channel raster granularity is 15 kHz, the target position shift $\Delta_F=5$ kHz; if the channel raster granularity is 30 kHz, $\Delta_F=10$ kHz; or if the channel raster granularity is 60 kHz, $\Delta_F=20$ kHz.

It should be noted that the first position shift, the second position shift, the target position shift, and the offset may be separately determined by using one or more of protocol definition, configuration by a network device, pre-configuration, and indication by another terminal device, provided that integrity of a parameter required for determining the target position can be ensured.

For example, the total position shift value is determined based on a result of summing the first position shift and the second position shift.

Alternatively, $\Delta_{shift}$ represents the first position shift, and F1 represents the second position shift. In this case, the position shift information may include at least one of the following plurality of cases:

(1) The position shift information indicates F1 and $\Delta_{shift}$, where a value of F1 or $\Delta_{shift}$ may be 0.

(2) The position shift information indicates F1 or $\Delta_{shift}$. Optionally, F1 or $\Delta_{shift}$ that is not indicated by the position shift information may be further determined in one manner of protocol definition, configuration by a network device, pre-configuration, and indication by another terminal device.

Further, F1 may be determined based on the target shift $\Delta_F$ and a corresponding offset N, that is, $F1=N\times\Delta_F$.

Then, the position shift information may indicate at least one of N, $\Delta_F$, or $\Delta_{shift}$.

Further, when the position shift information indicates only one or two of N, $\Delta_F$, and $\Delta_{shift}$, a parameter not indicated by the position shift information may be determined in at least one manner of protocol definition, configuration by a network device, pre-configuration, and indication by another terminal device. That is, different parameters may be obtained in different manners. For example, in a case that the position shift information configured by the network device indicates N, $\Delta_F$ and $\Delta_{shift}$ may be determined by means of pre-configuration, or may be respectively determined by means of pre-configuration and protocol predefinition. For example, in a case that N and $\Delta_{shift}$ are indicated in the position shift information configured by the network device, $\Delta_F$ may be determined by means of protocol predefinition.

In an implementation, a value set of N is $\{-1, 0, 1\}$, $\Delta_F$ may be 5 kHz, and $\Delta_{shift}$ may be 0 kHz or 7.5 kHz.

Further, the position shift information may indicate, in a manner of indicating $N\times\Delta_F+\Delta_{shift}=N1\times\Delta F2$, to determine the total position shift value based on N, $\Delta_F$, and $\Delta_{shift}$. Alternatively, another offset N1 may be determined in a manner of protocol definition, configuration by a network device, pre-configuration, or indication by another terminal device, and another position shift $\Delta_{F2}$ may be determined in a manner of protocol definition, configuration by a network device, pre-configuration, or indication by another terminal device. Alternatively, N1 and $\Delta_{F2}$ are respectively indicated by using any two manners of protocol definition, configuration by a network device, pre-configuration, and indication by another terminal device.

Optionally, in this embodiment 1, when the first device is a device of a different type, determining the position shift information in step 101 may be performed as different solutions. Details are as follows:

Solution 1

In this solution 1, the first device is a terminal device, and in this case, step 101 may be performed as at least one of the following:

obtaining the position configuration information sent by a second device;

determining the position configuration information based on a synchronization resource corresponding to the sidelink synchronization signal block S-SSB, where the position configuration information corresponds to the synchronization resource;

determining the position configuration information by means of pre-configuration; or determining the position configuration information by means of protocol definition.

It may be understood that if the position configuration method in this embodiment is performed by a terminal device, the position configuration information may be defined by a protocol.

The position configuration information may alternatively be determined based on a synchronization resource corresponding to the sidelink synchronization signal block S-SSB. That is, by making different synchronization resources correspond to different position configuration information, an implicit position configuration information indication solution is implemented. When it is determined to receive or send the synchronization resource of the S-SSB, the corresponding position configuration information may be determined. Different synchronization resources are generally corresponding to different time domain positions and shifts, and a shift herein may be a gap between the first S-SSB in an S-SSB cycle and a start point of the S-SSB cycle. For example, different synchronization resources are corresponding to different timeOffsetSSB-SL, and timeOffsetSSB-SL refers to a time offset (time Offset) of the S-SSB.

The position configuration information may alternatively be obtained from a second device associated with the first device. The second device may be a network device or a terminal device.

Further, when the second device is a network device, the position configuration information may be defined in a protocol, configured by the network device, preconfigured, or indicated by another terminal device. Alternatively, the position configuration information may be obtained from the second device by using at least one of: a physical broadcast channel (Physical Broadcast Channel, PBCH), a SIB, radio link control (Radio Link Control, RLC) layer signaling, packet data convergence protocol (Packet Data Convergence Protocol, PDCP) layer signaling, medium access control (Medium Access Control, MAC) layer signaling, or other radio resource control (Radio Resource Control, RRC) signaling.

When the second device is a terminal device, the position configuration information may be obtained from the second device by using at least one of: a physical sidelink broadcast channel (Physical Sidelink Broadcast Channel, PSBCH), an RS, a sequence, a physical sidelink feedback channel (Physical Sidelink Feedback Channel, PSFCH), L2 signaling, or RRC signaling.

Solution 2

In this solution 2, the first device is a network device, and in this case, step 101 may be performed as at least one of the following:

obtaining the position configuration information sent by a second device;

determining the position configuration information by means of pre-configuration; or determining the position configuration information by means of protocol definition.

It may be understood that if the position configuration method in this embodiment is performed by a network device, the position configuration information may be defined by a protocol.

The position configuration information may alternatively be obtained from a second device associated with the first device. The second device may be a network device or a terminal device.

Further, when the second device is a network device, the position configuration information may be defined by a protocol, configured by the network device, preconfigured, or indicated by another terminal device, and may be notified or negotiated by using at least one of an Xn interface, an F1 interface, an X2 interface, an N2 interface, or an S1 interface of the network device. When the second device is a terminal device, the position configuration information may be obtained from the second device by using at least one of UECapabilityInformation, UEAssistanceInformation, sidelinkUEinformation, RRCReconfigurationComplete, RRCReestablishmentComplete, RRCResumeComplete, or other RRC signaling.

Solution 3

In this solution 3, the first device is a terminal device, and in this case, step 101 may be performed as at least one of the following:

obtaining the position shift information sent by a second device;

determining the position shift information based on a synchronization resource corresponding to the sidelink synchronization signal block S-SSB, where the synchronization resource corresponds to the position shift information;

determining the position shift information by means of pre-configuration; or determining the position shift information by means of protocol definition.

It may be understood that if the position configuration method in this embodiment is performed by a terminal device, the position shift information may be defined by a protocol.

The position shift information may alternatively be determined based on a synchronization resource corresponding to the sidelink synchronization signal block S-SSB. That is, by making different synchronization resources correspond to different position shift information, an implicit position shift information indication solution is implemented. When it is determined to receive or send the synchronization resource of the S-SSB, the corresponding position shift information may be determined. Different synchronization resources are generally corresponding to different time domain positions and shifts, and a shift herein may be a gap between the first S-SSB in an S-SSB cycle and a start point of the S-SSB cycle. For example, different synchronization resources are corresponding to different timeOffsetSSB-SL.

The position shift information may alternatively be obtained from a second device associated with the first device. The second device may be a network device or a terminal device.

Further, when the second device is a network device, the position shift information may be defined by a protocol, configured by the network device, preconfigured, or indicated by another terminal device, and may be obtained from the second device by using at least one of a PBCH, a SIB, RLC layer signaling, PDCP layer signaling, MAC layer signaling, and other RRC signaling. When the second device is a terminal device, the position shift information may be obtained from the second device by using at least one of a PSBCH, an RS, a sequence, a PSFCH, L2 signaling, or RRC signaling.

Solution 4

In this solution 4, the first device is a network device, and in this case, step 101 may be performed as at least one of the following:

obtaining the position shift information sent by a second device;

determining the position shift information by means of pre-configuration; or determining the position shift information by means of protocol definition.

It may be understood that if the position configuration method in this embodiment is performed by a network device, the position shift information may be defined by a protocol.

The position shift information may alternatively be obtained from a second device associated with the first device. The second device may be a network device or a terminal device.

Further, when the second device is a network device, the position shift information may be defined by a protocol, configured by the network device, preconfigured, or indicated by another terminal device, and may be notified or negotiated by using at least one of an Xn interface, an F1 interface, an X2 interface, an N2 interface, or an S1 interface of the network device. When the second device is a terminal device, the position shift information may be obtained from the second device by using at least one of UECapabilityInformation, UEAssistanceInformation, sidelinkUEinformation, RRCReconfigurationComplete, RRCReestablishmentComplete, RRCResumeComplete, or other RRC signaling.

The foregoing solutions are described with reference to different examples:

(1) In a case of the position of the reference point A, an NR-ARFCN M indicated by means of protocol definition, configuration by a network device, pre-configuration, or indication by another terminal device may be used to indicate the point A. A user calculates a frequency domain position $F_M$ corresponding to M, that is, the reference position.

If an offset N is further obtained (e.g., −1, 0, or 1), it is considered that an actual position of the point A is $F_{actual\_M} = F_M + N \times \Delta_F$.

$\Delta_F$ is the target position shift, for example, may be 5 kHz, may be 10 kHz, 20 kHz, or another value. For example, when the SCS is 15 kHz, $\Delta_F = 5$ kHz; when the SCS is 30 kHz, $\Delta_F = 10$ kHz; or when the SCS is 60 kHz, $\Delta_F = 20$ kHz.

Further, a possibility of $\Delta_{shift}$ needs to be considered. If $\Delta_{shift}$ is further considered, the formula is $F_{actual\_M} = F_M + N \times \Delta_F + \Delta_{shift}$.

If N is not obtained, the default value is N=0. It is further considered that the actual position of the point A is $F_M$. In this case, the formula may be: $F_{actual\_M} = F_M + \Delta_{shift}$.

Further, after the actual position of the point A is determined, at least one of: an actual position of a carrier, an RF reference frequency of a carrier, a position of a BWP, a channel raster, a position of an S-SSB, a position of a channel, a position of a subchannel, a position of an RB, a position of a resource pool, a position of an RS, a position of a resource grid, a position of a subcarrier, a modulation position, an up-conversion position, or a position of a measurement object may be further determined.

(2) In a case of the position of the carrier, an NR-ARFCN indicated by means of protocol definition, configuration by a network device, pre-configuration, or indication by another terminal device may be used to indicate a carrier boundary position or indicate a carrier center position. Alternatively, the carrier boundary position or the center position is deduced based on the position of the point A, that is, the reference position.

Further, a frequency domain position (denoted as $F_c$) of a carrier boundary or a center is further determined, if the offset N is further obtained (which may be −1, 0, and 1), it is considered that an actual position of the carrier is $F_{actual\_c} = F_c + N \times \Delta_F$.

$\Delta_F$ is the target position shift, for example, may be 5 kHz, may be 10 kHz, 20 kHz, or another value. For example, when the SCS is 15 kHz, $\Delta_F$=5 kHz; when the SCS is 30 kHz, $\Delta_F$=10 kHz; or when the SCS is 60 kHz, $\Delta_F$=20 kHz.

Further, a possibility of $\Delta_{shift}$ needs to be considered. If $\Delta_{shift}$ is further considered, the formula is $F_{actual\_c\_} = F_c + N \times \Delta_F + \Delta_{shift}$.

If N is not obtained, N=0 by default, it is further considered that the actual position of the carrier is Fc. In this case, the formula may be: $F_{actual\_c} = F_c + \Delta_{shift}$.

Further, after the actual position of the carrier is determined, at least one of: an actual position of a point A, a position of a carrier, an RF reference frequency of a carrier, a position of a BWP, a channel raster, a position of an S-SSB, a position of a channel, a position of a subchannel, a position of an RB, a position of a resource pool, a position of an RS, a position of a resource grid, a position of a subcarrier, a modulation position, an up-conversion position, or a position of a measurement object may be further determined.

(3) In a case of the position of the BWP, an NR-ARFCN indicated by means of protocol definition, configuration by a network device, pre-configuration, or indication by another terminal device may be used to indicate a carrier boundary, a carrier center, a BWP boundary, or a BWP center. The user derives the BWP boundary or the BWP center based on the point A, the carrier boundary, or the carrier center, and is the reference position.

Further, the position of the BWP boundary or the BWP center is determined and denoted as $F_b$. If N (e.g., −1, 0, and 1) is further obtained, it is considered that an actual position of the BWP is $F_{actual\_b} = F_b + N \times \Delta_F$.

$\Delta_F$ is the target position shift, for example, may be 5 kHz, may be 10 kHz, 20 kHz, or another value. For example, when the SCS is 15 kHz, $\Delta_F$=5 kHz; when the SCS is 30 kHz, $\Delta_F$=10 kHz; or when the SCS is 60 kHz, $\Delta_F$=20 kHz.

Further, a possibility of $\Delta_{shift}$ needs to be considered. If $\Delta_{shift}$ is further considered, the formula is $F_{actual\_b} = F_b + N \times \Delta_F \pm \Delta_{shift}$.

If N is not obtained, N=0 by default. Further, it is considered that the actual position of BWP is $F_b$. In this case, the formula may be $F_{actual\_b} = F_b + \Delta_{shift}$.

Further, after the actual position of the BWP is determined, at least one of: an actual position of a carrier, an RF reference frequency of a carrier, a position of a BWP, a channel raster, a position of an S-SSB, a position of a channel, a position of a subchannel, a position of an RB, a position of a resource pool, a position of an RS, a position of a resource grid, a position of a subcarrier, a modulation position, an up-conversion position, or a position of a measurement object may be further determined.

(4) In a case of the channel raster, an NR-ARFCN indicated by means of protocol definition, configuration by a network device, pre-configuration, or indication by another terminal device may be used to indicate the channel raster of the carrier, or after the channel raster of the carrier is determined in another manner, a position $F_{raster}$ corresponding to the channel raster is determined, that is, the reference position.

If N (e.g., −1, 0, and 1) is further obtained, it is considered that an actual position of the channel raster is $F_{actual\_raster} = F_{raster} + N \times \Delta_F$.

$\Delta_F$ is the target position shift, for example, may be 5 kHz, may be 10 kHz, 20 kHz, or another value. For example, when the SCS is 15 kHz, $\Delta_F$=5 kHz; when the SCS is 30 kHz, $\Delta_F$=10 kHz; or when the SCS is 60 kHz, $\Delta_F$=20 kHz.

Further, a possibility of $\Delta_{shift}$ needs to be considered. If $\Delta_{shift}$ is further considered, the formula is $F_{actual\_raster} = F_{raster} + N \times \Delta_F \pm \Delta_{shift}$.

If N is not obtained, N=0 by default. It is further considered that the actual position of the channel raster is $F_{actual\_raster}$. In this case, the formula may be $F_{actual\_raster} = F_{raster} + \Delta_{shift}$.

(5) In a case of the position of the S-SSB, an NR-ARFCN or a GSCN indicated by means of protocol definition, configuration by a network device, pre-configuration, or indication by another terminal device may be used to indicate the position of the S-SSB (for example, the number corresponds to a position of a bandwidth center of the S-SSB or a position of a subcarrier of the S-SSB), it is determined that the position corresponding to the NR-ARFCN or the GSCN is $F_{S-SSB}$, that is, the reference position.

If N (e.g., −1, 0, and 1) is further obtained, it is considered that an actual position of the S-SSB is $F_{actual\_S-SSB} = F_{S-SSB} + N \times \Delta_F$.

$\Delta_F$ is the target position shift, for example, may be 5 kHz, may be 10 kHz, 20 kHz, or another value. For example, when the SCS is 15 kHz, $\Delta_F$=5 kHz; when the SCS is 30 kHz, $\Delta_F$=10 kHz; or when the SCS is 60 kHz, $\Delta_F$=20 kHz.

Further, a possibility of $\Delta_{shift}$ needs to be considered. If $\Delta_{shift}$ is further considered, the formula is $F_{actual\_S-SSB} = F_{S-SSB} + N \times \Delta_F + \Delta_{shift}$.

If N is not obtained, N=0 by default. In this case, the actual position of the S-SSB is $F_{actual\_S-SSB}$. In this case, $F_{actual\_S-SSB} = F_{S-SSB} + \Delta_{shift}$.

Further, for the foregoing various cases, one interpretation of $\Delta_{shift}$ is that a DC shift of 0 kHz or 7.5 kHz needs to be performed; the value of $\Delta_F$ may be 5 kHz, and the value of $\Delta_F$ in another embodiment may be 10 kHz, 15 kHz, or 20 kHz. For example, when the SCS is 15 kHz, $\Delta_F$=5 kHz; when the SCS is 30 kHz, $\Delta_F$=10 kHz; or when the SCS is 60 kHz, $\Delta_F$=20 kHz.

Embodiment 2

In this embodiment 2, if the position shift information cannot be obtained from the position configuration information, step 103 may be performed as:

determining a reference position, and determining the reference position as the target position.

Optionally, the reference position may include a position determined based on the foregoing existing position number, a channel raster, a synchronization raster, a global frequency domain raster, or another preset granularity, for example, include at least one of: a position of a point A, a position of a carrier, a position of a BWP, a channel raster, a position of an S-SSB, a position of an RS, a position of a resource grid, a position of a channel, a position of a subchannel, an RF reference frequency, a position of an RB, a position of a resource pool, or a position of a measurement object, which are determined based on existing granularity.

The existing position number may include at least one of an NR-ARFCN, an E-ARFCN, a GSCN, or another preset frequency domain position number. Optionally, the another preset frequency domain position number is a position number in a preset frequency domain range, for example, a subcarrier number in an RB range, a subcarrier number or an RB number in a carrier range, a subcarrier number or an RB number in a BWP range, a subcarrier number or an RB number in a resource pool range, a subcarrier number or an RB number in a subchannel range.

Embodiment 3

In this embodiment 3, the position configuration information includes position indication information. Alternatively, the position indication information is used for indicating the target position, and granularity corresponding to the target position is higher than preset granularity.

It may be understood that position granularity is redefined, configured, or preconfigured, so that the position precision covers a more abundant position than a position indicated based on the preset granularity, thereby effectively resolving a problem that an existing position number cannot be used to indicate an actually used position because an additional position shift is introduced. Alternatively, the precision may be a gap between two adjacent positions, and higher precision indicates a smaller gap.

Optionally, in the position configuration method in this embodiment of the present disclosure, the preset granularity may include at least one of precision corresponding to an NR-ARFCN, precision corresponding to an E-ARFCN, precision corresponding to a GSCN, or precision corresponding to another preset frequency domain position number. Optionally, the another preset frequency domain position number is a position number in a preset frequency domain range, for example, a subcarrier number in an RB range, a subcarrier number or an RB number in a carrier range, a subcarrier number or an RB number in a BWP range, a subcarrier number or an RB number in a resource pool range, a subcarrier number or an RB number in a subchannel range.

For example, the gap between two adjacent frequency domain positions is redefined, configured, or preconfigured as one of 1 kHz, 2 kHz, 2.5 kHz, 5 kHz, 10 kHz, 20 kHz, 25 kHz, 50 kHz, and 100 kHz. Further, a group of frequency domain positions may be defined, configured, or preconfigured based on the new granularity, and the frequency domain position may be renumbered, for example, denoted by $N_{REF'}$. Further, at least one of: a position of a point A, a position of a carrier, a position of an RF reference frequency, a position of a BWP, a channel raster, a position of an S-SSB, a position of a channel, a position of a subchannel, a position of an RB, a position of a resource pool, a position of an RS, a position of a resource grid, a position of a subcarrier, a modulation position, an up-conversion position, or a position of a measurement object may be defined, configured, or preconfigured by indicating $N_{REF'}$ or directly indicating a position in the foregoing set.

A frequency band n47 is used as an example for description, and position division is defined with granularity at a gap of 5 kHz in the frequency band to obtain a group of frequency domain position sets, where each position corresponds to one number $N_{REF'}$. Refer to the following two tables: Table 2 and Table 3.

TABLE 2

| NR operating band | $\Delta F_{Raster}$/kHz | Uplink $N_{REF'}$ range (first-<step size>last) | Downlink $N_{REF'}$ range (first-<step size>last) | |
|---|---|---|---|---|
| n47 | 5 | 790334-<1>-804334 | 790334-<1>-804334 | Step size = 1 indicates one 5 kHz. |
| | 10 | [790334-<2>-804334] | [790334-<2>-804334] | Step size = 2 indicates two 5 kHz. |
| | 20 | [790334-<4>-804334] | [790334-<4>-804334] | Step size = 4 indicates four 5 kHz. |

TABLE 3

| NR operating band | $\Delta F_{Raster}$/kHz | Sidelink $N_{REF'}$ range (first-<step size>last) | |
|---|---|---|---|
| n47 | 5 | 790334-<1>-804334 | Step size = 1 indicates one 5 kHz. |
| | 10 | [790334-<2>-804334] | Step size = 2 indicates two 5 kHz. |
| | 20 | [790334-<4>-804334] | Step size = 4 indicates four 5 kHz. |

Alternatively, for example, when $N_{REF}$=790401 is configured as the position of the point A, the position of the point A can be determined based on the position corresponding to $N_{REF}$=790401.

For band n47, a frequency domain position in the frequency band every 5 kHz is defined to belong to a frequency domain set F1 for 15 kHz, a frequency domain position in the frequency band every 10 kHz is defined to belong to a frequency domain set F2 for 30 kHz, a frequency domain position in the frequency band every 20 kHz is defined to belong to a frequency domain set F3 for 60 kHz, and each frequency domain position in F1, F2, and F3 corresponds to one number $N_{REF'}$. For details, refer to the following two tables: Table 4 and Table 5.

TABLE 4

| NR operating band | $\Delta F_{Raster}$/kHz | Uplink $N_{REF'}$ range (first-<step size>last) | Downlink $N_{REF'}$ range (first-<step size>last) | |
|---|---|---|---|---|
| n47 | 5 | 790334-<1>-804334 | 790334-<1>-804334 | Step size = 1 indicates one 5 kHz. |
| | 10 | [790334-<1>-797334] | [790334-<1>-797334] | Step size = 1 indicates one 10 kHz. |
| | 20 | [790334-<1>-793834] | [790334-<1>-793834] | Step size = 1 indicates one 20 kHz. |

TABLE 5

| NR operating band | $\Delta F_{Raster}$/kHz | Sidelink $N_{REF}$ range (first-<step size>last) | |
|---|---|---|---|
| n47 | 5 | 790334-<1>-804334 | Step size = 1 indicates one 5 kHz. |
| | 10 | [790334-<1>-797334] | Step size = 1 indicates one 10 kHz. |
| | 20 | [790334-<1>-793834] | Step size = 1 indicates one 20 kHz. |

Alternatively, for example, when the SCS=15 kHz and $N_{REF}$=790401 is configured as the position of the point A, the position corresponding to $N_{REF}$=790401 may be the position of the point A based on the SCS=15 kHz and $\Delta F_{Raster}$=5 kHz.

Embodiment 4

In this embodiment 4, the position configuration information includes position indication information. Alternatively, a target position determined based on the position configuration information is a target channel raster, and the target channel raster may be determined based on an integer multiple of a first preset gap and a second preset gap; and a value in a value set corresponding to the second preset gap includes at least one of 0, a multiple of 5 kHz, a multiple of 10 kHz, or a multiple of 20 kHz.

For example, a channel raster of 100 kHz (that is, the first preset gap)×P+Q (that is, the second preset gap in a unit of kHz) is used, where P is an integer. Alternatively, if P=3, optionally, a value set of Q may be a universal set or a subset of {0, ±5 kHz, ±10 kHz, ±15 kHz, ±20 kHz, ±25 kHz, ±30 kHz, ±35 kHz, ±40 kHz, ±45 kHz, ±50 kHz}, that is, multiples of 0 and 5 kHz are included.

Optionally, a value set of Q may be a universal set or a subset of {0, ±10 kHz, ±20 kHz, ±30 kHz, . . . , ±150 kHz}, that is, multiples of 0 and 10 kHz are included.

Optionally, a value set of Q may be a universal set or a subset of {0, ±20 kHz, ±40 kHz, ±60 kHz, . . . , ±300 kHz}, that is, multiples of 0 and 20 kHz are included.

Embodiment 5

In this embodiment 5, the position configuration information includes position indication information. Alternatively, the position indication information includes at least one of a value of the target position or a number of the target position.

It may be understood that, in a case of indicating the value of the target position based on the position indication information, the target position may be directly determined based on the value. In a case of indicating the number of the target position based on the position indication information, a specific target position may be further determined based on a preset relationship between the number and the value of the position.

Further, in the position configuration method in this embodiment of the present disclosure, the following steps may be further included:

Perform transmission based on the target position.

It may be understood that when the first device is used as a transmit end device, transmission based on the target position may refer to sending based on the target position. When the first device is used as a receive end device, transmission based on the target position may refer to receiving based on the target position. In this way, an error in understanding between transmitting and receiving parties may be avoided because an additional position shift is introduced, so that normal signal receiving and sending and communication can be performed between the transmitting and receiving parties.

Optionally, sidelink transmission may be performed based on the target position.

Optionally, when the position configuration information includes the position shift information, the terminal device may perform SL transmission based on the position shift information. Details are as follows:

For example, when the shift information is corresponding to N×5 kHz, SL transmission (that is, Enable the SL transmission with a N×5 kHz shift.) is performed based on the shift of N×5 kHz.

For example, when the shift information is corresponding to 7.5 kHz, SL transmission (that is, Enable the SL transmission with a 7.5 kHz shift.) is performed based on the shift of 7.5 kHz.

For example, when the shift information is corresponding to 7.5 kHz+N×5 kHz, SL transmission (that is, Enable the NR SL transmission with a 7.5 kHz+N×5 kHz shift.) is performed based on the shift of 7.5 kHz+N×5 kHz. Further, in the position configuration method in this embodiment of the present disclosure, the following steps may be further included:

Transmit an orthogonal frequency division multiplexing (Orthogonal Frequency Division Multiplexing, OFDM) signal based on the target position.

Optionally, an OFDM signal may be generated or received based on the target position.

It may be understood that after an accurate target position is determined, the user may generate a signal based on the target position during signal sending, and the user may receive a signal based on the target position during signal receiving. In this way, an error in signal generation caused by introducing an additional position shift or a problem of inconsistent understanding of a transmitted signal by receive and transmit ends may be avoided.

Optionally, the OFDM signal generated based on the target position may be transmitted based on the target position, including signal sending or signal receiving.

Currently, in R15, a time domain signal is transmitted by using the following formula (1) or (2). Alternatively, in a case of signal sending, it is considered that a corresponding signal is generated and sent based on the following formula (1) or (2). In a case of signal receiving, it is considered that the received signal meets the following formula (1) or (2):

$$s_l^{p,\mu}(t) = \sum_{k=0}^{N_{grid}^{size,\mu} N_{sc}^{RB}-1} a_{k,l}^{(p,\mu)} \cdot e^{j2\pi\left(k+k_0^\mu - N_{grid,x}^{size,\mu} N_{sc}^{RB}/2\right)\Delta f\left(t-N_{CP,l}^\mu T_c - t_{start,l}^\mu\right)}$$  Formula (1)

$$k_0^\mu = \left(N_{grid,x}^{start,\mu} + N_{grid,x}^{size,\mu}/2\right)N_{sc}^{RB} - \left(N_{grid,x}^{start,\mu_0} + N_{grid,x}^{size,\mu_0}/2\right)N_{sc}^{RB} 2^{\mu_0-\mu}$$

$$s_l^{(p,\mu)}(t) = \sum_{k=0}^{L_{RA}-1} a_k^{(p,RA)} e^{j2\pi(k+Kk_1+\bar{k})\Delta f_{RA}\left(t-N_{CP,l}^{RA}T_c-t_{start}^{RA}\right)}$$  Formula (2)

$$K = \Delta f/\Delta f_{RA}$$

$$k_1 = k_0^\mu + \left(N_{BWP,i}^{start} - N_{grid}^{start,\mu}\right)N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2$$

$$k_0^\mu = \left(N_{grid}^{start,\mu} + N_{grid}^{size,\mu}/2\right)N_{sc}^{RB} - \left(N_{grid}^{start,\mu_0} + N_{grid}^{size,\mu_0}/2\right)N_{sc}^{RB} 2^{\mu_0-\mu}$$

For example, in R15, for a downlink signal, a base station generates a signal according to formula (1), and when receiving the signal, the user considers that the signal meets formula (1). For example, for a PRACH signal, the user generates the PRACH signal according to formula (2), and when receiving the signal, the base station considers that the PRACH signal meets the formula. After the signal is generated, the transmit end modulates and upconverts the signal to a carrier frequency (carrier frequency) $f_0$.

$\mu$ is an SCS configuration, $\Delta f$ is a subcarrier spacing ($\Delta f = 2^\mu \cdot 15$ [kHz]), $\mu_0$ is an SCS configuration $\mu$ corresponding to a largest SCS in the SCS configuration, t is a time, p is a port number, k is a subcarrier number, l is a symbol number, $N_{grid}^{start,\mu}$ is a start point of a resource grid, $N_{grid,x}^{size,\mu} N_{sc}^{RB}$ is a size of the resource grid in the SCS configuration, $N_{CP,l}^\mu$ is a length of a cyclic prefix, and $N_{sc}^{RB}$ is a quantity of subcarriers in one RB.

In addition, it should be noted that the symbol used in the foregoing formula may be replaced and adjusted according to a specific applicable case, but essential content represented by the symbol is the same or similar, that is, any related deformation of the foregoing formula falls within the protection scope of this embodiment of the present disclosure.

Optionally, in a case that the position shift information corresponding to the target position is determined, when the OFDM signal is transmitted (that is, sent or received), optionally:

Method 1: For a signal that needs to be transmitted (it is assumed that the signal that needs to be transmitted is denoted as $S_l^{(p,\mu)}(t)$, where t is a time, p is a port number, and $\mu$ is an SCS configuration; certainly, the signal that needs to be transmitted may also be recorded as another form, depending on a specific situation of the signal that needs to be transmitted), phase rotation based on a shift is added. In this case, in an implementation, the actual signal transmitted (that is, sent or received) is as follows:

$$s_l^{(p,\mu)}(t) \cdot e^{j2\pi(shift)T},$$

where T is a time correlation quantity, and a possible value is $T = t - N_{CP,l}^\mu T_c - t_{start,l}^\mu$, and another possible value is $T = t$.

Alternatively, method 2: For a signal that needs to be transmitted (that is, sent or received) (it is assumed that the signal that needs to be transmitted is denoted as $S_l^{(p,\mu)}(t)$, where t is a time, p is a port number, and $\mu$ is an SCS configuration; certainly, the signal that needs to be transmitted may also be recorded as another form, depending on a specific situation of the signal that needs to be transmitted), carrier frequencies in modulation and up-conversion (Modulation and up conversion) are modified.

That is, if up-conversion used in signal transmission (that is, sending or receiving) is shifted, actual modulation and up-conversion positions at signal transmission (that is, sending or receiving) are $f_{0\_actual} = f_0 + shift$, where the shift is determined by using the position configuration information. In this case, an implementation method is to modulate and up-convert the signal to a frequency position ($f_0 + shift$) or $f_{0\_actual}$ according to the following formula, that is:

$$\operatorname{Re}\{s_l^{(p,\mu)}(t) \cdot e^{j2\pi(shift+f_0)(T)}\} \tag{3}$$

or written as $$\operatorname{Re}\{s_l^{(p,\mu)}(t) \cdot e^{j2\pi(f_{0\_actual})(T)}\} \tag{4}$$

where T is a time correlation quantity, and a possible value is $T = t - t_{start,l}^\mu - N_{CP,l}^\mu T_c$, and another possible value is $T = t$.

Optionally, an example is shift=$N \times \Delta_F$ in the foregoing method 2.

Optionally, an example is shift=$N \times \Delta_F + \Delta_{shift}$ in the foregoing method 2.

Further, in the position configuration method in this embodiment of the present disclosure, the following steps may be further included:

Send position-related information to a third device in a case that a preset condition is met, where the position-related information includes at least one of the position shift information, the position indication information, or the target position; and the preset condition includes one of the following:

a request for reporting a direct current DC position is obtained.

A request for reporting the position-related information is obtained. For example, a protocol defines position shift information reported by a user. In this case, the user reports the position shift information to the base station and/or another user. For example, a pre-configuration includes or enables (enable) a request for reporting the position shift information. In this case, the user reports the position shift information to the base station and/or another user. For example, a request for reporting position shift information is received from the base station and/or the another user.

A sidelink or an uplink is configured with a position shift. Alternatively, a network device may configure the position shift for the sidelink or the uplink (Uplink, UL). For example, the network device configures a frequency shift (frequency Shift) of 7.5 kHz for an UL carrier, or the network device configures a position shift for the SL.

Resource reconfiguration occurs, which may include at least one of: SL carrier reconfiguration, SL BWP reconfiguration, SL resource pool reconfiguration, UL carrier reconfiguration, UL BWP reconfiguration, downlink (Downlink, DL) carrier reconfiguration, or DL BWP reconfiguration.

A BWP is switched.

A resource pool is switched.

A beam failure (Beam Failure, BF) occurs.

a radio link failure (Radio Link Failure, RLF) occurs.

a beam failure recovery (Beam Failure Recovery, BFR) occurs.

a radio link failure recovery (Radio Link Failure Recovery, RFR) occurs.

Figure 4:
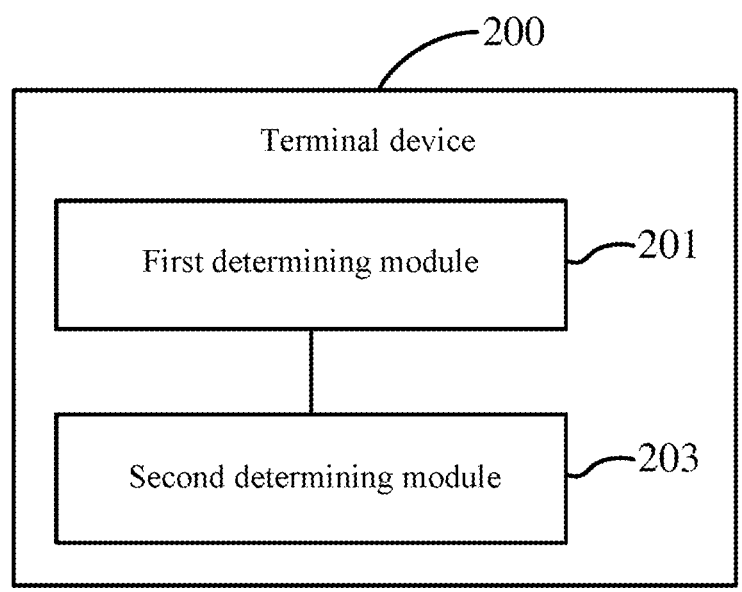
FIG. 4 is a schematic structural diagram of a terminal device according to an embodiment of the present disclosure.

Referring to FIG. 4, an embodiment of the present disclosure provides a terminal device 200. The terminal device 200 includes a first determining module 201 and a second determining module 203.

The first determining module 201 is configured to determine position configuration information, where the position configuration information includes at least one of position shift information or position indication information. The second determining module 203 is configured to determine a target position based on the position configuration information.

Optionally, in the terminal device 200 in this embodiment of the present disclosure, the position shift information includes at least one of a first position shift or a second position shift.

Optionally, in the terminal device 200 in this embodiment of the present disclosure, the second position shift is determined based on a target position shift and times of shift based on the target position shift.

Optionally, in the terminal device 200 in this embodiment of the present disclosure, the position shift information includes a position shift value.

Optionally, the terminal device 200 in this embodiment of the present disclosure may further include:

a transmission module, configured to perform transmission based on the target position.

Optionally, the terminal device 200 in this embodiment of the present disclosure may further include:

a generation module, configured to generate an orthogonal frequency division multiplexing OFDM signal based on the target position.

Optionally, in the terminal device 200 in this embodiment of the present disclosure, in a case that the position configuration information includes the position shift information, the second determining module 203 may be configured to:

determine a reference position; and perform shifting based on the reference position according to the position shift information to determine the target position.

Optionally, in the terminal device 200 in this embodiment of the present disclosure, the first determining module 201 may determine the position configuration information based on at least one of the following:

obtaining the position configuration information sent by a second device;

determining the position configuration information based on a synchronization resource corresponding to the sidelink synchronization signal block S-SSB, where the synchronization resource corresponds to the position shift information;

determining the position configuration information by means of pre-configuration;

or determining the position configuration information by means of protocol definition.

Optionally, in the terminal device 200 in this embodiment of the present disclosure, the target position includes at least one of: a position of a reference point A, a position of a carrier, a position of a radio frequency RF reference frequency, a position of a bandwidth part BWP, a channel raster, a position of an S-SSB, a position of a channel, a position of a subchannel, a position of a resource block RB, a position of a resource pool, a position of a reference signal RS, a position of a resource grid, a position of a subcarrier, a modulation position, an up-conversion position, or a position of a measurement object.

Optionally, in the terminal device 200 in this embodiment of the present disclosure, the position indication information is used for indicating the target position, and precision corresponding to the target position is higher than preset granularity.

Optionally, in the terminal device 200 in this embodiment of the present disclosure, in a case that the target position is a target channel raster, the target channel raster is determined based on an integer multiple of the first preset gap and the second preset gap. A value in a value set corresponding to the second preset gap includes at least one of 0, a multiple of 5 kHz, a multiple of 10 kHz, or a multiple of 20 kHz.

Optionally, in the terminal device 200 in this embodiment of the present disclosure, the position indication information includes at least one of a value of the target position or a number of the target position.

Optionally, the terminal device 200 in this embodiment of the present disclosure may further include:

a sending module, configured to send position-related information to a third device in a case that a preset condition is met, where the position-related information includes at least one of the position shift information, the position indication information, or the target position; and the preset condition includes one of the following:

a request for reporting a direct current DC position is obtained;

a request for reporting the position-related information is obtained;

a sidelink or an uplink is configured with a position shift;

resource reconfiguration occurs;

a BWP is switched;

a resource pool is switched;

a beam failure BF occurs;

a radio link failure RLF occurs;

beam failure recovery BFR occurs; or radio link failure recovery RFR occurs.

It can be understood that the terminal device 200 provided in this embodiment of the present disclosure can implement the foregoing position configuration method performed by the terminal device 200. Related descriptions of the foregoing position configuration method are applicable to the terminal device 200, and details are not described herein again.

In this embodiment of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information. In this way, an accurate position can be learned by using the position configuration information in the embodiments of the present disclosure, to resolve a problem that a position after a shift cannot be indicated based on an existing position number because an additional position shift is introduced.

Figure 5:
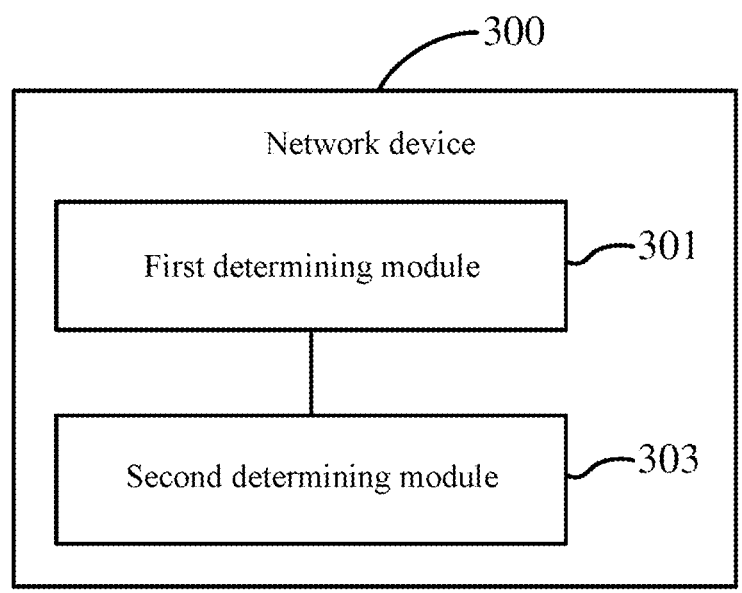
FIG. 5 is a schematic structural diagram of a network device according to an embodiment of the present disclosure.

Referring to FIG. 5, an embodiment of the present disclosure provides a network device 300. The network device 300 includes a first determining module 301 and a second determining module 303.

The first determining module 301 is configured to determine position configuration information, where the position configuration information includes at least one of position shift information or position indication information. The second determining module 303 is configured to determine a target position based on the position configuration information.

Optionally, in the network device 300 in this embodiment of the present disclosure, the position shift information includes at least one of a first position shift or a second position shift.

Optionally, in the network device 300 in this embodiment of the present disclosure, the second position shift is determined based on a target position shift and times of shift based on the target position shift.

Optionally, in the network device 300 in this embodiment of the present disclosure, the position shift information includes a position shift value.

Optionally, the network device 300 in this embodiment of the present disclosure may further include:
a transmission module, configured to perform transmission based on the target position.

Optionally, in the network device 300 in this embodiment of the present disclosure, the transmission module may be further configured to:
transmit an orthogonal frequency division multiplexing OFDM signal based on the target position.

Optionally, in the network device 300 in this embodiment of the present disclosure, in a case that the position configuration information includes the position shift information, the second determining module 303 may be configured to:
determine a reference position; and
perform shifting based on the reference position according to the position shift information to determine the target position.

Optionally, in the network device 300 in this embodiment of the present disclosure, the first determining module 301 may determine the position configuration information based on at least one of the following:
obtaining the position configuration information sent by a second device;
determining the position configuration information by means of pre-configuration;
or
determining the position configuration information by means of protocol definition.

Optionally, in the network device 300 in this embodiment of the present disclosure, the target position includes at least one of: a position of a reference point A, a position of a carrier, a position of a radio frequency RF reference frequency, a position of a bandwidth part BWP, a channel raster, a position of an S-SSB, a position of a channel, a position of a subchannel, a position of a resource block RB, a position of a resource pool, a position of a reference signal RS, a position of a resource grid, a position of a subcarrier, a modulation position, an up-conversion position, or a position of a measurement object.

Optionally, in the network device 300 in this embodiment of the present disclosure, the position indication information is used for indicating the target position, and precision corresponding to the target position is higher than preset granularity.

Optionally, in the network device 300 in this embodiment of the present disclosure, in a case that the target position is a target channel raster, the target channel raster is determined based on an integer multiple of the first preset gap and the second preset gap. A value in a value set corresponding to the second preset gap includes at least one of 0, a multiple of 5 kHz, a multiple of 10 kHz, or a multiple of 20 kHz.

Optionally, in the network device 300 in this embodiment of the present disclosure, the position indication information includes at least one of a value of the target position or a number of the target position.

Optionally, the network device 300 in this embodiment of the present disclosure may further include:
a sending module, configured to send position-related information to a third device in a case that a preset condition is met, where the position-related information includes at least one of the position shift information, the position indication information, or the target position; and
the preset condition includes one of the following:
a request for reporting a direct current DC position is obtained;
a request for reporting the position-related information is obtained;
a sidelink or an uplink is configured with a position shift;
resource reconfiguration occurs;
a BWP is switched;
a resource pool is switched;
a beam failure BF occurs;
a radio link failure RLF occurs;
beam failure recovery BFR occurs; or
radio link failure recovery RFR occurs.

It can be understood that the network device 300 provided in this embodiment of the present disclosure can implement the foregoing position configuration method performed by the network device 300. Related descriptions of the foregoing position configuration method are applicable to the network device 300, and details are not described herein again.

In this embodiment of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information. In this way, an accurate position can be learned by using the position configuration information in the embodiments of the present disclosure, to resolve a problem that a position after a shift cannot be indicated based on an existing position number because an additional position shift is introduced.

Figure 6:
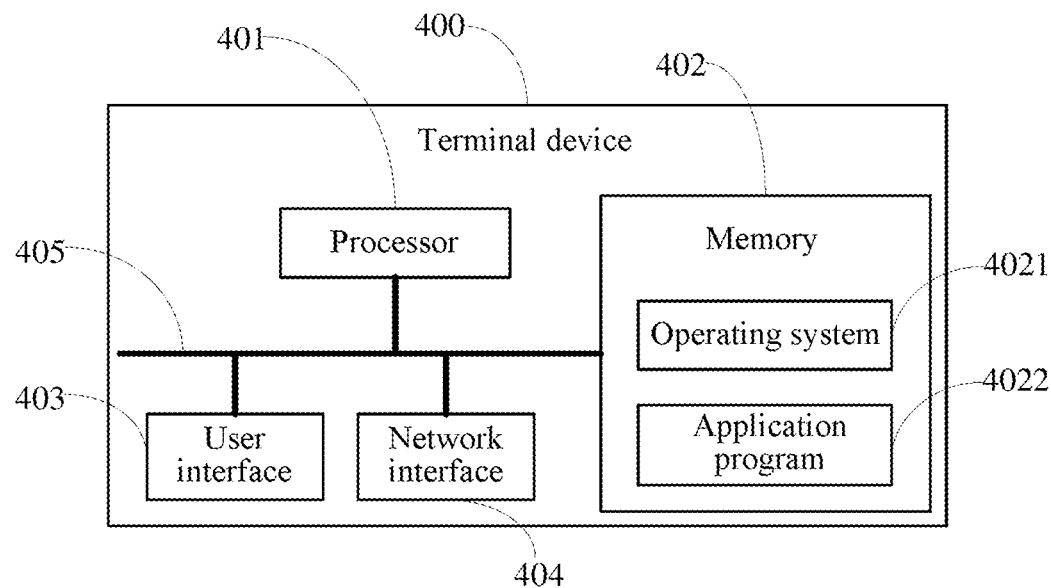
FIG. 6 is a schematic structural diagram of a second terminal device according to an embodiment of the present disclosure.

FIG. 6 is a schematic structural diagram of a second terminal device according to an embodiment of the present disclosure. A terminal device 400 shown in FIG. 6 includes at least one processor 401, a memory 402, at least one network interface 404, and a user interface 403. All components in the terminal device 400 are coupled together by a bus system 405. It may be understood that the bus system 405 is configured to implement connection and communication between the components. In addition to a data bus, the bus system 405 further includes a power bus, a control bus, and a status signal bus. However, for ease of clear description, all types of buses are marked as the bus system 405 in FIG. 6.

The user interface 403 may include a display, a keyboard, or a click/tap device (such as a mouse, a trackball, a touch panel, or a touchscreen).

It may be understood that, the memory 402 in the embodiments of the present disclosure may be a volatile memory or a non-volatile memory, or may include both a volatile memory and a non-volatile memory. The non-volatile memory may be a read-only memory (read-only memory, ROM), a programmable ROM (programmable ROM, PROM), an erasable programmable read-only memory (erasable PROM, EPROM), an electrically EPROM (electrically EPROM, EEPROM), or a flash memory. The volatile memory may be a random access memory (random access memory, RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 402 in the system and method described in the embodiments of the present disclosure is intended to include, but is not limited to, the memories and any other memory of a suitable type.

In some implementations, the memory 402 stores the following elements: an executable module or a data structure, or a subset thereof, or an extension set thereof: an operating system 4021 and an application program 4022.

The operating system 4021 includes various system programs, for example, a framework layer, a core library layer, a driver layer, and the like, which are used for implementing various basic services and processing a task based on hardware. The application program 4022 may include various application programs such as a media player (Media Player), a browser (Browser), and the like, used for implementing various application services. A program for implementing the method in the embodiments of the present disclosure may be included in the application program 4022.

In this embodiment of the present disclosure, the terminal device 400 further includes: a computer program stored on the memory 402 and executable by the processor 401, when executed by the processor 401, the computer program implementing the following steps:

determining position configuration information, where the position configuration information includes at least one of position shift information or position indication information; and determining a target position based on the position configuration information.

In this embodiment of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information. In this way, an accurate position can be learned by using the position configuration information in the embodiments of the present disclosure, to resolve a problem that a position after a shift cannot be indicated based on an existing position number because an additional position shift is introduced.

The method disclosed in the embodiments of the present disclosure may be applied to the processor 401 or implemented by the processor 401. The processor 401 may be an integrated circuit chip having a capability of processing a signal. In an implementation process, steps in the foregoing methods can be implemented by using a hardware integrated logical circuit in the processor 401, or by using instructions in a form of software. The foregoing processor 401 may be a general-purpose processor, a digital signal processor (Digital Signal Processor, DSP), an application-specific integrated circuit (Application Specific Integrated Circuit, ASIC), a field-programmable gate array (Field Programmable Gate Array, FPGA) or another programmable logic device, a discrete gate or a transistor logic device, or a discrete hardware component, and may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a ROM, a programmable ROM, an electrically erasable programmable memory, or a register. The computer-readable storage medium is located in the memory 402, and the processor 401 reads information in the memory 402, and completes the steps in the foregoing methods in combination with hardware thereof. Alternatively, the computer-readable storage medium stores a computer program. The computer program, when executed by the processor 401, causes the processor to perform the steps of the foregoing methods.

It may be understood that, the embodiments described in the embodiments of the present disclosure may be implemented by using software, hardware, firmware, middleware, microcode, or a combination thereof. For hardware implementation, the processing unit may be implemented by one or more application-specific integrated circuits (Application Specific Integrated Circuits, ASIC), digital signal processors (Digital Signal Processor, DSP), digital signal processor devices (DSP Device, DSPD), programmable logic devices (PLDs), field programmable gate arrays (Field-Programmable Gate Array, FPGA), general-purpose processors, controllers, microcontrollers, microprocessors, other electronic components configured to implement the functions of the present disclosure, or a combination thereof.

For software implementation, the technology described in the embodiments of the present disclosure may be implemented by using modules (for example, processes and functions) implementing the functions of the embodiments of the present disclosure. Software code may be stored in a memory and executed by a processor. The memory may be implemented inside or outside the processor.

The terminal device 400 can implement the processes implemented by the terminal device in the foregoing embodiments. To avoid repetition, details are not described herein again.

Alternatively, an embodiment of the present disclosure further provides a terminal device, including a processor, a memory, and a computer program on the memory and executed on the processor, where when executed by the processor, the computer program implements the processes of the embodiment of the foregoing position configuration method applied to the terminal device, and can achieve the same technical effects. To avoid repetition, details are not described herein again.

Figure 7:
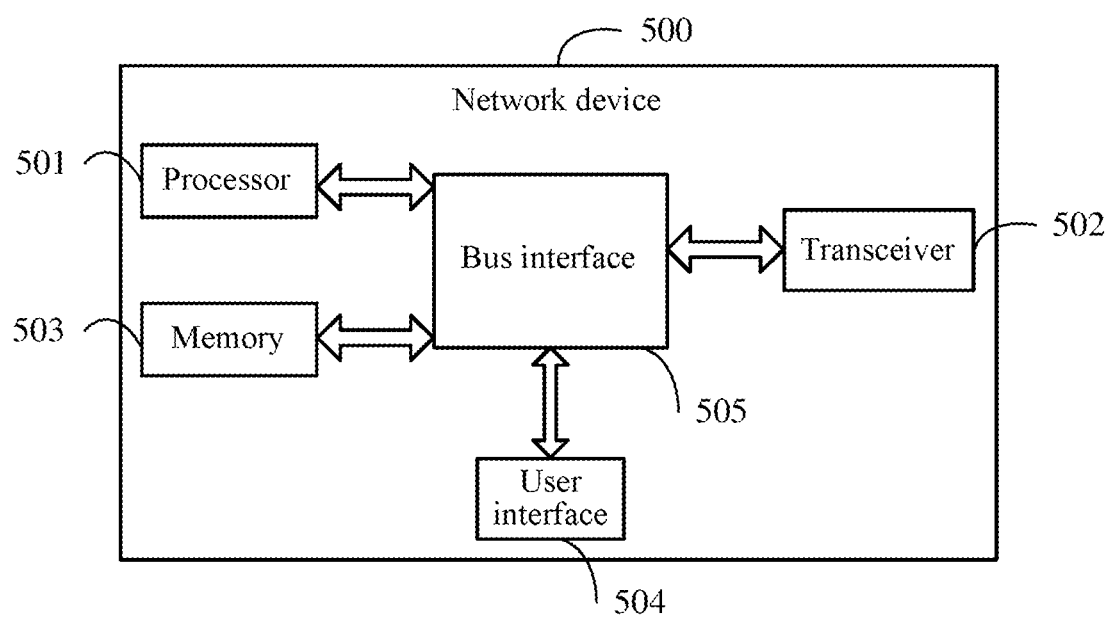
FIG. 7 is a schematic structural diagram of a second network device according to an embodiment of the present disclosure.

Referring to FIG. 7, FIG. 7 is a schematic structural diagram of a second network device according to an embodiment of the present disclosure, which can implement details of the position configuration method mentioned above, and can achieve the same technical effects. As shown in FIG. 7, a network device 500 includes: a processor 501, a transceiver 502, a memory 503, a user interface 504, and a bus interface 505.

In this embodiment of the present disclosure, the network device 500 further includes: a computer program stored on the memory 503 and executable by the processor 501, when executed by the processor 501, the computer program implementing the following steps:

determining position configuration information, where the position configuration information includes at least one of position shift information or position indication information; and determining a target position based on the position configuration information.

In this embodiment of the present disclosure, position configuration information that includes at least one of position shift information or position indication information needs to be first determined, and further, a final target position may be determined based on the position configuration information. Alternatively, for a case in which a position shift is additionally introduced, a specific case of the shift may be directly determined by using the position shift information, or certainly, a specific case of a final position after the shift may be directly indicated by using the position indication information. In this way, an accurate position can be learned by using the position configuration information in the embodiments of the present disclosure, to resolve a problem that a position after a shift cannot be indicated based on an existing position number because an additional position shift is introduced.

In FIG. 7, a bus architecture may include any quantity of interconnected buses and bridges, and connects with circuits that are of one or more processors represented by the processor 501 and of a memory represented by the memory 503. The bus architecture may further connect various other circuits of a peripheral, a voltage regulator, a power management circuit, and the like. This is well known in the art, and therefore, no further description is provided in this specification. The bus interface 505 provides an interface. The transceiver 502 may be a plurality of components, including a transmitter and a receiver, and providing units for communicating with various other apparatuses on a transmission medium. For different user equipment, the user interface 504 may be an interface capable of externally or internally connecting a required device, the connected device includes, but not limited to, a keypad, a display, a speaker, a microphone, and a joystick.

The processor 501 is responsible for the management of the bus architecture and normal processing, and the memory 503 may store data used when the processor 501 performs an operation.

Alternatively, an embodiment of the present disclosure further provides a network device, including a processor, a memory, and a computer program on the memory and executed on the processor, where when executed by the processor, the computer program implements the processes of the embodiment of the foregoing position configuration method applied to the network device, and can achieve the same technical effects. To avoid repetition, details are not described herein again.

An embodiment of the present disclosure further provides a computer-readable storage medium, storing a computer program, where the computer program, when executed by a processor, implements the processes of the embodiments of the foregoing position configuration method applied to the terminal device, and can achieve the same technical effects. To avoid repetition, details are not described herein again. The computer-readable storage medium is, for example, a read-only memory (Read-Only Memory, ROM), a random access memory (Random Access Memory, RAM), a magnetic disk, an optical disc, or the like.

An embodiment of the present disclosure further provides a computer-readable storage medium, storing a computer program, where the computer program, when executed by a processor, implements the processes of the embodiments of the foregoing position configuration method applied to the network device, and can achieve the same technical effects. To avoid repetition, details are not described herein again. The computer-readable storage medium is, for example, a ROM, a RAM, a magnetic disk, an optical disc, or the like.

It is to be noted that, the terms "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure have been described above with reference to the accompanying drawings. The present disclosure is not limited to the embodiments described above, and the embodiments described above are merely exemplary and not limitative. A person of ordinary skill in the art may make various variations under the enlightenment of the present disclosure without departing from the spirit of the present disclosure and the protection scope of the claims, and such variations shall all fall within the protection scope of the present disclosure.

What is claimed is:

1. A position configuration method performed by a first device, comprising:
   determining position configuration information, wherein the position configuration information comprises position shift information;
   determining a target position based on the position configuration information; and
   performing transmission based on the target position;
   the determining a target position based on the position configuration information comprises:
   determining a reference position; and
   performing shifting based on the reference position according to the position shift information, to determine the target position;
   wherein the position shift information comprises at least one of a first position shift or a second position shift;
   the first position shift is represented by $\Delta_{shift}$, and the second position shift is represented by F1, wherein F1=N×$\Delta_F$, a value set of N is {−1, 0, 1}, $\Delta_F$ is 5 kHz, and $\Delta_{shift}$ is 0 kHz or 7.5 kHz, wherein $\Delta_F$ represents a target position shift, and N represents times of shift based on the target position shift.

2. The method according to claim 1, wherein the position shift information comprises a position shift value.

3. The method according to claim 1, wherein the method further comprises:
   transmitting an orthogonal frequency division multiplexing (OFDM) signal based on the target position.

4. The method according to claim 1, wherein the reference position comprises a position determined based on a position number, a channel raster, a synchronization raster, a global frequency domain raster, or predetermined granularity; and
   the position number comprises at least one of a new radio absolute radio frequency channel number (NR-ARFCN), an evolved universal terrestrial radio access absolute radio frequency channel number (E-ARFCN), a global synchronization channel number (GSCN), or a preset frequency domain position number; or
   wherein the reference position comprises at least one of: a position of a reference point A, a position of a carrier, a position of a bandwidth part (BWP), a channel raster, a position of a sidelink synchronization signal block (S-SSB), a position of a reference signal (RS), a position of a resource grid, a position of a channel, a position of a subchannel, a radio frequency (RF) reference frequency, a position of a resource block (RB), a position of a resource pool, or a position of a measurement object.

5. The method according to claim 1, wherein the position shift information is N×5 kHz, 7.5 kHz, or 7.5 kHz+N×5 kHz.

6. The method according to claim 1, wherein in a case that the first device is a terminal device, the determining position configuration information comprises at least one of the following:
   obtaining the position configuration information sent by a second device;
   determining the position configuration information based on a synchronization resource corresponding to a sidelink synchronization signal block (S-SSB), wherein the position configuration information corresponds to the synchronization resource;
   determining the position configuration information by means of pre-configuration; or
   determining the position configuration information by means of protocol definition; or
   wherein in a case that the first device is a network device, the determining position configuration information comprises at least one of the following:
   obtaining the position configuration information sent by a second device;
   determining the position configuration information by means of pre-configuration; or
   determining the position configuration information by means of protocol definition.

7. The method according to claim 1, wherein the target position comprises at least one of: a position of a reference point A, a position of a carrier, a radio frequency (RF) reference frequency, a position of a bandwidth part (BWP), a channel raster, a position of a sidelink synchronization signal block (S-SSB), a position of a channel, a position of a subchannel, a position of a resource block (RB), a position of a resource pool, a position of a reference signal (RS), a position of a resource grid, a position of a subcarrier, a modulation position, an up-conversion position, or a position of a measurement object.

8. The method according to claim 1, wherein the position configuration information comprises further comprises position indication information used for indicating the target position, and granularity corresponding to the target position is higher than preset granularity.

9. The method according to claim 1, wherein in a case that the target position is a target channel raster, the target channel raster is determined based on an integer multiple of a first preset gap and a second preset gap; and
   a value in a value set corresponding to the second preset gap comprises at least one of 0, a multiple of 5 kHz, a multiple of 10 kHz, or a multiple of 20 kHz.

10. The method according to claim 1, wherein the position configuration information comprises further comprises position indication information comprising at least one of a value of the target position or a number of the target position.

11. The method according to claim 1, wherein the position configuration information comprises further comprises position indication information, the method further comprises:
    sending position-related information to a third device in a case that a preset condition is met, wherein the position-related information comprises at least one of the position shift information, the position indication information, or the target position; and
    the preset condition comprises one of the following:
    a request for reporting a direct current (DC) position is obtained;
    a request for reporting the position-related information is obtained;
    a sidelink or an uplink is configured with a position shift;
    resource reconfiguration occurs;
    a bandwidth part (BWP) is switched;
    a resource pool is switched;
    a beam failure (BF) occurs;
    a radio link failure (RLF) occurs;
    beam failure recovery (BFR) occurs; or
    radio link failure recovery (RFR) occurs.

12. A terminal device, comprising:
    a processor; and
    a memory storing a computer program that is capable of being run on the processor, wherein the computer program, when executed by the processor, causes the terminal device to:

determine position configuration information, wherein the position configuration information comprises position shift information;

determine a target position based on the position configuration information; and perform transmission based on the target position;

wherein the computer program, when executed by the processor, causes the terminal device to:

determine a reference position; and perform shifting based on the reference position according to the position shift information, to determine the target position;

wherein the position shift information comprises at least one of a first position shift or a second position shift;

the first position shift is represented by $\Delta_{shift}$, and the second position shift is represented by F1, wherein F1=N×$\Delta_F$, a value set of N is {−1, 0, 1}, $\Delta_F$ is 5 kHz, and $\Delta_{shift}$ is 0 kHz or 7.5 kHz, wherein $\Delta_F$ represents a target position shift, and N represents times of shift based on the target position shift.

13. The terminal device according to claim 12, wherein the reference position comprises a position determined based on a position number, a channel raster, a synchronization raster, a global frequency domain raster, or predetermined granularity; and wherein the position number comprises at least one of a new radio absolute radio frequency channel number (NR-ARFCN), an evolved universal terrestrial radio access absolute radio frequency channel number (E-ARFCN), a global synchronization channel number (GSCN), or a preset frequency domain position number; or wherein the reference position comprises at least one of: a position of a reference point A, a position of a carrier, a position of a bandwidth part (BWP), a channel raster, a position of a sidelink synchronization signal block (S-SSB), a position of a reference signal (RS), a position of a resource grid, a position of a channel, a position of a subchannel, a radio frequency (RF) reference frequency, a position of a resource block (RB), a position of a resource pool, or a position of a measurement object.

14. The terminal device according to claim 12, wherein the position shift information is N×5 kHz, 7.5 kHz, or 7.5 kHz+N×5 kHz.

15. A network device, comprising:

a processor; and a memory storing a computer program that is capable of being run on the processor, wherein the computer program, when executed by the processor, causes the network device to:

determine position configuration information, wherein the position configuration information comprises position shift information;

determine a target position based on the position configuration information; and perform transmission based on the target position;

wherein the computer program, when executed by the processor, causes the terminal device to:

determine a reference position; and perform shifting based on the reference position according to the position shift information, to determine the target position;

wherein the position shift information comprises at least one of a first position shift or a second position shift;

the first position shift is represented by $\Delta_{shift}$, and the second position shift is represented by F1, wherein F1=N×$\Delta_F$, a value set of N is {−1, 0, 1}, $\Delta_F$ is 5 kHz, and $\Delta_{shift}$ is 0 kHz or 7.5 kHz, wherein $\Delta_F$ represents a target position shift, and N represents times of shift based on the target position shift.

16. The network device according to claim 15, wherein the position shift information is N×5 kHz, 7.5 kHz, or 7.5 kHz+N×5 kHz.

* * * * *